United States Patent Office 2,856,369
Patented Oct. 14, 1958

2,856,369

EPOXY-SUBSTITUTED ESTERS OF PHOSPHORUS-CONTAINING ACID AND THEIR POLYMERS

Curtis W. Smith, Berkeley, George B. Payne, Albany, and Edward C. Shokal, Walnut Creek, Calif., assignors to Shell Development Company, Emeryville, Calif., a corporation of Delaware No Drawing. Application May 8, 1953
Serial No. 353,904

15 Claims. (Cl. 260—2)

This invention relates to a new class of phosphorus-containing organic compounds. More particularly, the invention relates to novel epoxy-substituted esters of certain phosphorus-containing acids, to their polymers and to the use of the novel esters and polymers, particularly as plasticizers, stabilizers and synthetic lubricants.

Specifically, the invention provides new and particularly useful esters of alcohols containing at least one epoxy group, and phosphorus-containing acids of the group consisting of phosphonic acids, phosphinic acids, phosphonous acids, phosphinous acids and phosphorous acid and derivatives of these acids obtained by replacing an oxygen atom attached to the phosphorus atom with a dissimilar chalkogen, i. e., sulfur, selenium or tellurium. As a preferred embodiment, the invention provides neutral esters of the alkanols having the epoxy group in the terminal position and polybasic phosphorus-containing acids, such as the phosphonic acids, phosphonous acids and phosphorous acid and derivatives of these acids obtained by replacing an oxygen atom attached to the phosphorus atom with a dissimilar chalkogen.

The invention also provides polymers of the above-described esters obtained by polymerizing the esters by themselves or with other epoxy-substituted products to produce valuable polymer products.

It is an object of the invention to provide a new class of organic compounds containing phosphorus. It is a further object to provide novel epoxy-substituted esters of certain phosphorus-containing acids and polymers thereof. It is a further object to provide novel epoxy-substituted esters of phosphonic acids, phosphinic acids, phosphonous acids, phosphinous acids and phosphorous acid and derivatives of these acids wherein an oxygen atom attached to the phosphorous atom is replaced by sulfur, selenium or tellurium. It is a further object to provide novel epoxy-substituted esters of the above-described acids which are useful and valuable in industry, particularly as plasticizers or stabilizers for various oils and resins. It is a further object to provide epoxy-substituted esters which are useful as nonflammable lubricants and hydraulic fluids. It is a further important object to provide novel epoxy-substituted esters which can be used to produce valuable homopolymeric and copolymeric products. It is a further object to provide novel 2,3-epoxypropyl esters of polybasic phosphorus-containing acids, such as the phosphinic and phosphonous acids and their derivatives, which are particularly valuable in preparing infusible, insoluble polymers. Other objects and advantages of the invention will be apparent from the following detailed description thereof.

It has now been discovered that these and other objects may be accomplished by the novel compounds of the invention comprising esters of alcohols containing at least one epoxy group and phosphorus-containing acids of the group consisting of phosphonic acids, phosphinic acids, phosphonous acids, phosphinous acids and phosphorous acid and derivatives thereof obtained by replacing the oxygen atom attached to the phosphorus molecule with a dissimilar chalkogen, i. e., sulfur, selenium or tellurium. It has been found that the unique structural configuration of the above-described esters of the invention endows them with many unusual and unobvious properties. The novel esters are, for example, good lubricants and hydraulic fluids and are particularly suited for use as lubricants for engines which are subjected to high temperatures such as combustion engines. The novel esters are also valuable as plasticizers for synthetic resins such as poly(vinyl chloride). With the halogen-containing polymers the novel esters may also act both as a heat and light stabilizer as well as a plasticizing agent.

The novel esters, and particularly the glycidyl esters of the above-noted polybasic acids, are also of great value in the preparation of polymeric products as they may be polymerized with themselves or with other epoxy-substituted materials, such as the epichlorohydrin-bisphenol reaction products, to produce polymeric products having new and improved properties. The utilization of the novel esters in these and other important applications is described more completely hereinafter.

The epoxy-substituted alcohols, the phosphorus acid esters of which are provided by the present invention, comprise those alcohols possessing at least one epoxy group, i. e., a

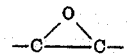

group, which is preferably not more than four carbon atoms removed from a terminal hydroxyl group. The alcohols may be monohydric or polyhydric, primary, secondary or tertiary and may be saturated, unsaturated, branched or unbranched and open-chain or cyclic. Examples of these alcohols include:

2,3-epoxypropanol
3,4-epoxybutanol
2,3-epoxyhexanol
5,6-epoxyoctanol
3,4-epoxycyclohexanol
2,3-epoxydihydrofuran-5-propanol
2,3-epoxydihydrofuran-5-methanol
2,3-epoxydihydropyran-5-hexanol
2,3-epoxydihydropyran-5-butanol
2,3-epoxypentanediol-1,5
2,3-epoxybutanediol-1,4
2,3-epoxycyclohexanediol-1,4
3,4-epoxyhexanediol-1,6
2,3-dimethyl-4,5-epoxy-octanol
2-methoxy-4,5-epoxyoctanol
2,3-epoxy-4-chlorocyclohexanol
2,3-epoxydodecanol.

Preferred epoxy-substituted alcohols are the epoxy-substituted aliphatic monohydric alcohols containing from 3 to 15 carbon atoms, such as 3,4-epoxybutanol
5,6-epoxydecanol
2,3-cyclohexanol
2,3-epoxyoctanol
3,4-epoxydodecanol and
2-methyl-2,3-epoxypropanol and the aliphatic dihydric alcohols containing from 4 to 15 carbon atoms, such as 2,3-epoxybutanediol-1,4
2,3-epoxyhexanediol-1,5
3,4-epoxyoctanediol-1,6 and
2,3,4,5-diepoxycyclohexanediol-1,6.

Particularly preferred are the monoepoxy-substituted alkanols containing from 3 to 8 carbon atoms, and having the epoxy group in the terminal position. 2,3-alkanols, such as 2,3-epoxypropanol, are of special interest, particularly because of the ease of preparation of their resulting esters as well as the superior properties possessed by such esters.

The phosphorus-containing acids, novel esters of which are provided by the present invention, consist of the phosphonic acids, phosphinic acids, phosphonous acids, phosphinous acids and phosphorus acid and derivatives of these acids obtained by replacing an oxygen atom attached to the phosphorus atom with sulfur, selenium or tellurium.

The expression "phosphonic acids" as used herein refers to dibasic acids of the formula

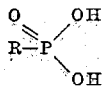

wherein R is an organic radical that is bonded to the phosphorus atom by a carbon-to-phosphorus bond. The esters of these acids will be referred to as "phosphonates."

The expression "phosphinic acids" as used here refers to monobasic acids of the formula

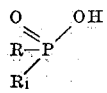

wherein R is an organic radical bonded to the phosphorus atom by a carbon-to-phosphorus bond and $R_1$ is a hydrogen or a radical as denoted by R. The esters of these acids will be referred to as "phosphinates."

The expression "phosphonous acids" as used herein refers to dibasic acids of the formula

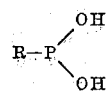

wherein R is an organic radical bonded to the phosphorus atom by a carbon-to-phosphorus bond. The esters of these acids will be referred to herein as "phosphonites."

The expression "phosphinous acids" as used herein refers to monobasic acids of the formula

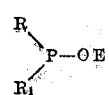

wherein R and $R_1$ are as defined above. The esters of these acids will be referred to herein as "phosphinites."

Phosphorus acid exhibits properties of both a di- and tribasic acid and is considered to exist in the forms

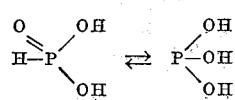

The esters of these acids will be referred to herein as "phosphites."

Representative phosphonic acids, novel esters of which are provided by the present invention, include, among others, benzenephosphonic acid, cyclohexanephosphonic acid, propanephosphonic acid, butanephosphonic acid, 2,3,4-trimethylpentanephosphonic acid, 2-hexenephosphonic acid, tetradecanephosphonic acid, 3-cyclohexanephosphonic acid, and 2-phenylethanephosphonic acid. Preferred members of this group of acids are the hydrocarbon-substituted phosphonic acids, and more particularly, the aromatic hydrocarbon-substituted phosphonic acids containing no more than 15 carbon atoms and the aliphatic hydrocarbon-substituted phosphonic acids, such as the alkane and cycloalkane, alkene and cycloalkene phosphonic acids, containing no more than 12 carbon atoms.

Representative phosphinic acids, novel esters of which are provided by the present invention, include, among others, dibutanephosphinic acid, dibenzenephosphinic acid, dipropanephosphinic acid, dicyclohexanephosphinic acid, di(2-butene)phosphinic acid, didodecanephosphinic acid, cyclohexane(butane)phosphinic acid and benzene(butane)phosphinic acid. Preferred members of this group of acids are the di-hydrocarbon-substituted phosphinic acids, and more particularly, the di-aromatic hydrocarbon-substituted phosphinic acids containing no more than 15 carbon atoms in each hydrocarbon radical and the aliphatic hydrocarbon-substituted phosphonic acids, such as the dialkane and dicycloalkane, dialkene and dicycloalkene phosphonic acids, containing no more than 12 carbon atoms in each radical.

Illustrative examples of the phosphonous acids, novel esters of which are provided by the present invention, include, among others, benzenephosphonous acid, butanephosphonous acid, cyclohexanephosphonous acid, dodecanephosphonous acid, propanephosphonous acid and 2-butenephosphonous acid. Preferred members of this group of acids are the hydrocarbon-substituted phosphonous acids, and more particularly, the aromatic hydrocarbon-substituted phosphonous acids containing no more than 15 carbon atoms and the aliphatic hydrocarbon-substituted phosphonous acids, such as the alkane and cycloalkane, alkene and cycloalkene phosphonic acids, containing no more than 12 carbon atoms.

Representative examples of the phosphinous acids, novel esters of which are provided by the present invention, include, among others, dibenzenephosphinous acid, dibutanephosphinous acid, didodecanephosphinous acid, dicyclohexanephosphinous acid, cyclohexane(butane)phosphinous acid, and benzene(butane)phosphinous acid. Preferred members of this group are the dihydrocarbon-substituted phosphinous acids, and more particularly, the di-aromatic hydrocarbon-substituted phosphinous acids containing no more than 15 carbon atoms in each hydrocarbon radical and the aliphatic hydrocarbon-substituted phosphinous acids, such as the dialkane, dicycloalkane, dialkene and dicycloalkene phosphonous acids, containing no more than 12 carbon atoms in each radical.

Esters of derivatives of the above-described phosphonic acids, phosphinic acids, phosphonous acids, phosphinous acids and phosphorous acid wherein the oxygen atom attached to the phosphorus atom is replaced by a sulfur, selenium or tellurium atom are also provided by the present invention. When the oxygen atom attached to the phosphorus atom through the double bond is replaced by the sulfur atom, the compounds will be named herein by placing the term "thiono" before the acid name and when the oxygen atom joined to the phosphorous atom through the single bond is replaced by the sulfur atom, the compounds will be named by placing the term "thio" before the name. Thus, the sulfur-substituted phosphonic acids may be illustrated by the following formula

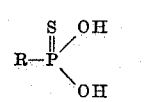 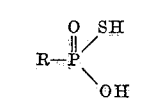

thionophosphonic acids    thiophosphonic acids

When the oxygen atom is replaced by selenium, the compounds will be referred to herein by placing the term "selenono" before the acid name, and when the oxygen joined to the phosphorus atom through the single bond is replaced by selenium, the term "seleno" will be placed before the acid name. The corresponding terms "tellurnono" and "tellurno" will be used when tellurium is used to replace the oxygen atom joined to the phosphorus atom through the double bond and through the single bond, respectively. Illustrative examples of these substituted phosphonic, phosphinic, phosphonous, phosphinous acids and phosphorous acids are benzene thionophosphonic acid, propanethiophosphonic acid, tetradecanethionophosphonic acid, cyclohexanethionophosphonic acid, 2-phenylethanethionophosphonic acid, benzene(butane)thionophosphinic acid, dioctanethionophosphinic acid, benzeneselenonophosphonic acid, butaneselenophosphonic acid, dicyclohexaneselenophosphinous acid, dichlorobenzenetellurnophosphonous acid, dicyclohexanetellurnophosphinous acid, dicyclohexanetellurnophosphonic acid, dichlorobenzenethiophosphinous acid, thiophosphorous acid and selenophosphorous acid.

Partial esters of the above-described polybasic phosphorus-containing acids and their substituted derivatives may also be used in the preparation of the claimed epoxy-substituted esters. Representative examples of such partial esters include methyl benzene phosphonate, butyl benzenephosphonate, phenyl benzenephosphonate, amyl benzenethionophosphonate, hexyl benzenephosphonite, octyl butanethionophosphonite, cyclohexyl butanephosphonite, hexyl phosphite, dioctyl phosphite, S-amyl thiophosphite, and S amyl benzenethiophosphonite. Preferred partial esters are the esters of the polybasic phosphorus-containing acids described above and the monohydric aliphatic alcohols, preferably containing from 1 to 10 carbon atoms.

The novel esters of the invention are those derived by the esterification of any one of the above-described acids with any one or more of the above-described alcohols.

The novel esters of the invention derived from the above-noted phosphonic acids, and their sulfur, selenium and tellurium derivatives may be exemplified by the following:

O-(5,6-epoxyhexyl) S-butyl methanethiophosphonate
O-(2,3-epoxypropyl) S-butyl benzenethiophosphonate
O-(2,3-epoxypropyl) Se-butyl benzeneselenophosphonate
Bis(3,4-epoxyoctyl) benzeneselenonophosphonate
Bis(2,3-epoxypropyl) benzeneselenonophosphonate
O-(2,3-epoxypropyl) S-butyl butanethiophosphonate
S,S bis (2,3-epoxypropyl) benzenethiophosphonate
S,S bis(3,4-epoxyhexyl) butanethiophosphonate
Bis(2,3-epoxypropyl) butanethionophosphonate
Bis(3,4-epoxycyclohexyl) benzenethionophosphonate
Bis(2,3-epoxyoctyl) methanethionophosphonate The novel esters of the invention derived from the above-described phosphinic acids and their sulfur, selenium and tellurium substituted derivatives may be exemplified by the following:

2,3-epoxypropyl bis(methylbenzene) phosphinate
5,6-epoxyhexyl dibutanephosphinate
2,3-epoxypropyl dimethanephosphinate
2,3-epoxypropyl dimethanethiophosphinate
2,3-epoxypropyl dibenzeneselenonophosphinate
2,3-epoxyhexyl dibutanephosphinate
7,8-epoxyoctyl dibutanephosphinate
3,4-epoxyoctyl dibenzenethionophosphinate
2,3-epoxyhexyl dibutaneselenonophosphinate
5,6-epoxydecyl dibutanetellurnonophosphinate
3,4-epoxydecyl dibutanethiophosphinate
2,3-epoxyhexyl dicyclohexanethiophosphinate The novel esters of the invention derived from the above-described phosphonous acid and their sulfur, selenium and tellurium substituted derivatives may be exemplified by the following:

Bis(3,4-epoxyoctyl) hexanephosphonite
Bis(2,3-epoxypropyl) butanephosphonite
Bis(2,3-epoxyhexyl) benzenephosphonite
Bis(3,4-epoxydecyl) benzenephosphonite
Bis(2,3-epoxyoctyl) cyclohexanephosphonite
S,O-bis(2,3-epoxypropyl) butanethiophosphonite
Bis(5,6-epoxyhexyl) butanethionophosphonite
Bis(2,3-epoxyhexyl) benzeneselenonophosphonite
S,S-bis(3,4-epoxy-cyclohexyl) benzenethiophosphonite
S,S-bis(2,3-epoxyoctyl) butanethiophosphonite Examples of the esters of the invention derived from the above-noted phosphinous acids and their sulfur, selenium and tellurium substituted derivatives include, among others:

6,7-epoxydecyl dibenzenethiophosphinite
2,3-epoxypropyl dibenzenethiophosphinite
5,6-epoxyhexyl dibutaneselenophosphinite
3,4-epoxyoctyl dimethanephosphinite
2,3-epoxynonyl dioctanethiophosphinite
3,4-epoxycyclohexyl dioctaneselenophosphinite
3,4-epoxydodecyl dibutanetellurnophosphinite
5,6-epoxydecyl dicyclohexanetellurnophosphinite The novel esters of the invention derived from phosphorous acid and its sulfur, selenium and tellurium derivatives may be exemplified by the following:

Bis(5,6-epoxyhexyl)phosphite
Bis(2,3-epoxypropyl)phosphite
Tris(4,5-epoxycyclohexyl)phosphite
Tris(2,3-epoxypropyl)phosphite
Tris(2,3-epoxyhexyl)phosphite
S,S,S tris(2,3-epoxypropyl)thiophosphite
S,S,S tris(5,6-epoxyoctyl)thiophosphite
S,S,O tris(2,3-epoxyhexyl)thiophosphite
S,S bis(3,4-epoxyoctyl)allyl thiophosphite
S,S bis(2,3-epoxypropyl)phenyl thiophosphite
Te,Te,Te tris(2,3-epoxypropyl)tellurnophosphite
Te,Te,Te tris(2,3-epoxypropyl)selenophosphite The novel esters of the invention derived from the partial esters of the above-described polybasic acids and their derivatives may be exemplified by the following:

2,3-epoxypropyl butyl benzenephosphonate
3,4-epoxyhexyl amyl benzenephosphonate
3,4-epoxyoctyl phenyl benzenethionophosphonate
2,3-epoxypropyl hexyl benzenephosphonite
3,4-epoxyoctyl hexyl butanephosphonite
2,3-epoxypropyl dioctyl phosphite
Di(2,3-epoxypropyl) octyl phosphite Esters of the invention derived from the above-described phosphorus-containing acids and the epoxy-substituted polyhydric alcohols may be exemplified by the following:

3,4-epoxypentanediol-1,5 bis(dibenzenephosphinate)
2,3-epoxyhexanediol-1,6 bis(dimethanephosphinate)
2,3-epoxypentanediol-1,5 bis(dibenzenephosphinite)
2,3-epoxyhexanediol-1,6 bis(dioctanephosphinite)

Particularly preferred esters of the invention are the esters of the epoxy-substituted aliphatic monohydric alcohols having the epoxy group and hydroxyl group as the only functional groups and the organo-phosphorus acids, such as the hydrocarbon phosphonic acids, the hydrocarbon-substituted phosphinic acids, the hydrocarbon-substituted phosphonous acids and the hydrocarbon-substituted phosphinous acids and their sulfur, selenium and tellurium derivatives as represented by the following formula

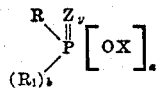

wherein Z is a chalkogen, R is a hydrocarbon radical, preferably containing no more than 12 carbon atoms, $R_1$ is a member of the group consisting of hydrogen or hydrocarbon radicals, X is an epoxy-substituted aliphatic hydrocarbon radical, preferably a 2,3-epoxyalkyl radical containing no more than 8 carbon atoms, $b$ is 0 or 1, $a$ is $2-b$ and $y$ is 0 or 1.

Of special interest, particularly because of the fine properties of the polymers prepared therefrom are the neutral esters of the 2,3-epoxyalkanols and polybasic acids, such as the hydrocarbon phosphonic acids, phosphonous acids and phosphorous acids, as represented by the following formula

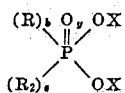

wherein X is a 2,3-epoxyalkyl radical, R is a hydrocarbon radical, preferably containing no more than 12 carbon atoms, $R_2$ is a member of the group consisting of hydrocarbon radicals, preferably containing no more than 12 carbon atoms, and 2,3-epoxyalkyl radicals, $y$ is 0 or 1, $b$ is 0 or 1, $c$ is 0 or 1, when $y$ is 0 $b$ is 0, and when $y$ is 1 $c$ is 0.

The novel esters of the invention may be prepared by a variety of different methods. They may be prepared, for example, by epoxidizing the corresponding unsaturated esters of the phosphorus-containing acids, or they may be prepared by reacting the epoxy-substituted alcohol with a phosphorus halide corresponding to the desired acid.

The epoxidation of the unsaturated esters of the phosphorus-containing acids is advantageously carried out by reacting the unsaturated ester with an epoxidizing agent at a temperature between about $-20°$ C. to about $60°$ C. Organic peracids, such as peracetic, perbenzoic, monoperphthalic and the like acids, are usually effective epoxidizing agents for this type of reaction. It is preferred to carry out the reaction in a suitable mutual solvent for the reactants product. Chloroform is an especially useful solvent for this purpose, but other materials such as ethyl ether, dichlormethane, benzene, ethyl acetate, etc. are also suitable. It is not necessary to operate under anhydrous conditions but the amount of water present should be limited so as to avoid excessive hydrolysis of the epoxy groups. Up to 25% water in the reaction mixture can be tolerated. The epoxy-substituted esters may be recovered from the reaction mixture by any suitable means, such as distillation, extraction and the like.

The unsaturated esters of the phosphorus-containing acids used in the above-described epoxidation reaction are preferably the esters of the above-described phosphorous-containing acids and ethylenically unsaturated alcohols, such as, for example, Allyl alcohol
Methallyl alcohol
Crotyl alcohol
4-hexenol
5-decenol
2,4-hexadienol
3-pentenol
4,6-octadecenol
2-butyl-2-propenol
2-phenyl-2-propenol
2-methyl-3-butenol and the like. Preferred esters are those of the aliphatic monohydric alcohols having an ethylenic group in the terminal position, such as, for example, Allyl alcohol
Methallyl alcohol
4-butenol
5-pentenol
4,6-hexadienol and the like. Of special interest are the esters of the allylic alcohols, i. e., the beta-gamma-monoethylenically unsaturated alcohols, and particularly those of the formula

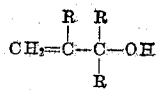

wherein R is a hydrocarbon radical, and preferably an alkyl radical containing from 1 to 6 carbon atoms.

Examples of the unsaturated esters that can be used in the above-described epoxidation reaction include Diallyl benzenephosphonate
Dimethallyl butanephosphonate
Triallyl phosphite
Diallyl benzenethiophosphonate
Allyl dibenzenephosphonite
Dicrotyl dibutanephosphonite
Methallyl dimethanethiophosphonite
Diallyl octanethionophosphonate
Di(4-hexenyl) butanephosphonite
Di(5-decenyl) benzenephosphonate
Allyl dibutanethiophosphinite
Allyl dioctanethiophosphinite
Allyl dibutanetellurnophosphinite
2-hexenyl dibutanethiophosphinite
Di(3,6-octadienyl) butanephosphonate
2-hexenyl dibutaneselenophosphinite The above-described unsaturated esters may be obtained by reacting the acid halides with the unsaturated alcohols by the method described hereinafter for preparing the novel esters by reacting the epoxy alcohols with the acid halides.

The novel esters of the invention may also be prepared by treating the desired epoxy-substituted alcohol with a phosphorus halide corresponding to the desired acid in the presence of a hydrogen halide absorbing material. This method of preparation may be illustrated by the following equation showing the preparation of bis(2,3-epoxypropyl) benzenephosphonite from benzene phosphorus dichloride and 2,3-epoxypropanol:

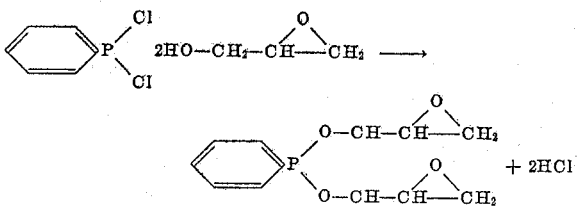

The type of reaction may be carried out by simply mixing the desired phosphorus halide with the alcohol in an inert solvent, such as toluene or benzene, in the presence of a hydrogen halide absorbing material at relatively low temperatures. The reactants may be employed conveniently in substantially stoichiometrically required amounts, although in the event one reactant is more precious than the other a moderate excess of the less precious may be employed to insure high conversion of the other reactant to desired product. The reaction is preferably carried out at temperatures within the range of $-10°$ C. to $30°$ C., and more preferably between the range of $0°$ C. to $15°$ C. In the event excessive heat is liberated in the reaction mixture, the reaction mixture may be cooled or the reaction may be maintained under control by dilution of the mixture with an inert solvent. The reaction may also be regulated by the controlled addition of one reactant, e. g., the phosphorus halide may be added dropwise to the other reactant. The material used to absorb the hydrogen halide should be one that would not react with the acid halide or epoxy group or cause polymerization of the epoxide. Preferred materials are the rather weak inorganic bases and tertiary amines, such as triethylamine, triamylamine, pyridine, and the like. Upon completion of the reaction, any salt formed by the reaction of the added hydrogen-halide absorbing material and the liberated hydrogen halide may be removed from the reaction mixture by filtration or equivalent means and the filtrate suitably treated to recover the desired ester. In most cases, fractional distillation is the most convenient method for recovering the desired product although it will be appreciated that other applicable methods may be used in appropriate cases.

The novel esters of the invention are substantially colorless relatively high-boiling liquids to semi-solids. They are soluble in a great many oils and solvents and are compatible with synthetic resins and polymers, such as the vinyl chloride polymers. In combination with these materials they may act as a stabilizing agent against deterioration by heat, lights, etc. and in combination with the polymers, such as vinyl chloride polymers, may act both as a stabilizing agent and a plasticizing agent.

The novel esters are also particularly useful in the preparation of valuable polymeric products. For this purpose they may be polymerized by themselves or with other types of epoxy-containing materials. The homopolymers of the novel esters containing only one epoxy group are preferably obtained by heating the monomers in the presence of catalysts, such as aluminum bromide, bismuth trichloride, zinc chloride, boron trifluoride, and the like. About 1% to 10% of catalyst is usually sufficient to effect the desired degree of polymerization. It is generally preferred to accomplish the polymerization using this type of catalyst in a solvent, such as petroleum ether, chloroform, benzene, isopropyl ether, and the like. The temperature employed will generally vary between about 50° C. to 100° C., and more preferably, between 0° C. and 60° C. The lower temperatures tend to give waxy solid-type polymers, while the higher temperatures tend to give viscous liquid to soft, solid polymers.

The novel esters containing a plurality of epoxy groups, such as the above-described special group of neutral esters of the 2,3-epoxyalkanols and the phosphonic acids, phosphonous acids and phosphorous acid, can be polymerized by treating the same with a great variety of different catalysts, such as amine catalysts as triethylamine, ethylene diamine, amine-aldehyde, or amide-aldehyde type resins, such as those prepared from formaldehyde and amide or amines as urea, thiourea, hydroxy urea, phenyl thiourea, and the like, diisocyanates, dialdehydes, polycarboxylic acids and the like. The amount of catalyst utilized will vary depending upon the type of reactants and catalyst selected, but in most cases will vary from about .1% to about 5% by weight. If the catalyst is of a polymeric nature larger amounts, such as from 20% to 40% may be used. The temperature employed in the polymerization may also vary over a wide range depending upon the reactants and catalyst. In most instances, the polymerization may be accomplished at temperatures between —15° C. to about 200° C. and more preferably, between 20° C. and 70° C.

The properties of the polymers can be altered by copolymerizing them with other compounds. Thus, two or more different esters of the invention may be copolymerized together, or the esters can be copolymerized with other types of epoxy-containing materials, such as ethylene oxide, propylene oxide, isobutylene epoxide, epichlorohydrin, vinyl cyclohexene dioxide, butadiene mono- or dioxide, epoxy ethers, such as diglycidyl ether and glycidyl ethers of polyhydric phenols obtained by reacting a polyhydric phenol, such as bis-phenol, with an excess of a halogen-containing epoxide, such as epichlorohydrin, in an alkaline medium, polyepoxy polyethers obtained by reacting, preferably in the presence of an acid-acting compound, such as hydrofluoric acid, a halogen-containing epoxide, such as epichlorohydrin, with a polyhydric alcohol, such as glycerol, ethylene glycol, hexanetriol, sorbitol, mannitol, pentaerythritol, polyglycerol, and the like, and subsequently treating the resulting product with an alkaline component to replace the epoxy group, and polyepoxide esters, such as di(2,3-epoxypropyl) adipate, and the like. The glycidyl polyethers of polyhydric phenols obtained by condensing polyhydric phenols with epichlorohydrin are also referred to as "ethoxyline" resins. See Chemical Week, vol. 69, page 27, for September 8, 1951.

The polymers prepared from the monoepoxy-substituted esters as described above find use in the preparation of coating compositions, impregnating compositions and as water-proofing agents for silica-gel greases, and the like. The homopolymers and copolymers prepared from the epoxy-substituted esters having a plurality of epoxy groups are insoluble, infusible materials useful for the formation of pottings, castings and rigid plastic articles.

To illustrate the manner in which the invention may be carried out the following examples are given. It is to be understood, however, that the examples are for the purpose of illustration and the invention is not to be regarded as limited to any of the specific conditions recited therein. Unless otherwise specified, parts disclosed in the following examples are parts by weight.

*Example I.—Bis(2,3-epoxypropyl) benzenephosphonate*

About 252 parts of a 30% peracetic acid solution were added dropwise to a solution of 110 parts of diallyl benzenephosphonate and 500 parts of chloroform at 30° C. The mixture was allowed to stand at room temperature for several days and was then washed with water and a 20% solution of potassium carbonate and filtered through sodium sulfate. The mixture was then Claisen distilled to remove the chloroform. The desired bis(2,3-epoxypropyl) benzenephosphonate was recovered as a light yellow, almost odorless liquid boiling at 185° C. to 200° C. (0.7 mm.). The structure of the bis(2,3-epoxypropyl) benzene phosphonate is as follows:

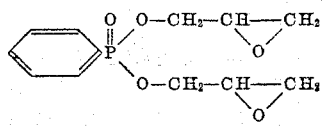

The sample of the above ester was analyzed and found to contain 11.4% P, 52.9% C and 5.8% H, compared to the calculated values of 11.5% P, 53.4% C, and 5.6% H. The ester had an epoxy value of 0.34 eq./100 g.

The above ester may be used as a hydraulic fluid and as a combined plasticizer-stabilizer for poly(vinyl chloride). The ester could also be polymerized when heated with ethylene diamine to form a hard solid resin.

*Example II.—Di(2,3-epoxypropyl) benzenephosphonite*

About 22 parts of glycidol and 32 parts of triethylamine was dissolved in 150 parts of toluene. The solution was stirred rapidly and held at 0–10° C. while 26.85 parts of benzene phosphorous dichloride was added dropwise. The triethylamine hydrochloride was filtered off and the solvent removed under vacuum. The desired bis(2,3-epoxypropyl) benzenephosphonite was recovered from the bottoms as a fluid, colorless liquid having a boiling point of about 99° C. (0.5 mm.). The structure of the bis(2,3-epoxypropyl) benzenephosphonite is as follows

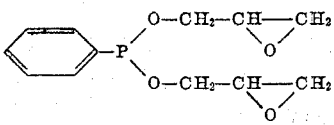

The above ester had an epoxy value of 0.427 eq./100 g. and a refractive index of 1.5579.

The bis(2,3-epoxypropyl) benzenephosphonite is of value as a nonflammable lubricating oil and as a combined plasticizer-stabilizer for the vinyl chloride polymers. The ester could also be polymerized when heated with triethylamine to form a resin suitable for use for preparing coating compositions, pottings and the like.

*Example III.—Tris(2,3-epoxypropyl) phosphite*

About 75 parts of glycidol and 65 parts of triethylamine are dissolved in 200 parts of toluene. The solution is stirred rapidly and held at 0° C. to 10° C. while 46 parts of phosphorous trichloride is added dropwise. The precipitated amine salt is filtered off and the reaction mixture distilled under reduced pressure. The desired tris(2,3-epoxypropyl) phosphite is recovered as a relatively colorless fluid liquid. The structure of the tris(2,3-epoxypropyl) phosphite is as follows:

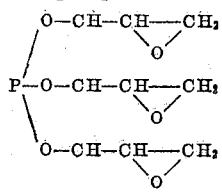

The tris(2,3-epoxypropyl) phosphite described above is of particular value as a combined plasticizer-stabilizer for poly(vinyl chloride). The ester may also be polymerized when heated with ethylene diamine to form a resin.

*Example IV.—2,3-epoxypropyl dimethanephosphinate*

About 37 parts of glycidol and 65 parts of triethylamine are dissolved in 200 parts of toluene. The solution is stirred rapidly and held at 0° C. to 10° C. while 46 parts of dimethyloxychlorophosphine is added dropwise. The precipitated amine salt is filtered off and the reaction mixture distilled under reduced pressure. The desired 2,3-epoxypropyl dimethanephosphinate is recovered as a relatively high boiling colorless liquid. The structure of the 2,3-epoxypropyl dimethanephosphinate is as follows:

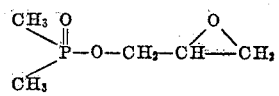

The above ester may be polymerized when heated with a primary amine catalyst to form a hard resin.

*Example V.—2,3-epoxybutanediol-1,4 bis(dimethanephosphinate)*

About 42 parts of 2,3-epoxybutanediol-1,4 and 65 parts of trimethylamine are dissolved in 200 parts of toluene. The solution is stirred rapidly and held at 0° C. to 10° C. while 111 parts of dimethyloxychlorophosphine is added dropwise. The precipitated amine salt is filtered off and the reaction mixture distilled under reduced pressure. 2,3-epoxybutanediol-1,4 bis(dimethanephosphinate) having the structure indicated below is recovered as the desired product

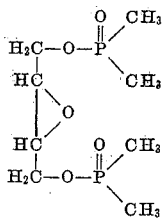

*Example VI.—2,3-epoxypropyl dibutanephosphinite*

About 37 parts of glycidol and 65 parts of triethylamine are dissolved in 200 parts of toluene. The solution is stirred rapidly and held at −5° to 10° C. while 80 parts of dibutanechlorophosphine is added dropwise. The precipitated amine salt is filtered off and the solvent removed under reduced pressure. The desired 2,3-epoxypropyl dibutanephosphinite is recovered as a relatively colorless liquid. The ester has the following structure:

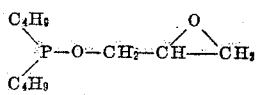

In addition to the compounds specifically illustrated in the foregoing examples, related esters having a selenium or tellurium atom attached to the phosphorous atom may be prepared in an analogous manner. Following are examples of other esters that can be prepared by the above-noted methods of preparation.

PHOSPHONATES

Bis(2,3-epoxypropyl) benzenethionophosphonate
Bis(5,6-epoxyhexyl) benzenethionophosphonate
Bis(2,3-epoxypropyl) butanethionophosphonate
Bis(2,3-epoxyhexyl) octanethionophosphonate
Bis(3,4-epoxydecyl) butanethionophosphonate
Bis(2,3-epoxyoctyl) benzeneselenophosphonate
Bis(2,3-epoxyoctyl) benzenetellurnophosphonate

PHOSPHINATES

S-2,3-epoxypropyl dibenzenethiophosphinate
Se-5,6-epoxyoctyl dibenzeneselenophosphinate
Te-3,4-epoxycyclohexyl dibutanetellurnophosphinate

PHOSPHONITES

S,S bis(5,6-epoxyhexyl) benzenethiophosphonite
Se,O bis(2,3-epoxyoctyl) butaneselenophosphonite
Te,Te bis(3,4-epoxybutyl) methanetellurnophosphonite
S,S bis(2,3-epoxypropyl) butanethiophosphonite

PHOSPHINITES

S-5,6-epoxyhexyl dibenzenethiophosphinite
Se-2,3-epoxybutyl dibutaneselenophosphinite
Te-3,4-epoxyoctyl dibutanetellurnophosphinite
S-2,3-epoxyhexyl dioctanethiophosphinite

PHOSPHITES

Se, Se, Se tris(2,3-epoxypropyl) selenophosphite
Te, Te, Te tris(2,3-epoxyhexyl) tellurnophosphite
S,S,S tris(6,7-epoxyoctyl) thiophosphite
S,S,S tris(3,4-epoxyamyl) thiophosphite

We claim as our invention:

1. A bis(epoxyalkyl) benzenephosphonate wherein each of the epoxyalkyl groups is a vic-epoxyalkyl group of from 3 to 8 carbon atoms and wherein the epoxy group is at the end of the alkyl radical.
2. An epoxyalkyl dialkanephosphinate wherein the epoxyalkyl group is a vic-epoxyalkyl group of from 3 to 8 carbon atoms and wherein the epoxy group is at the end of the alkyl radical, and wherein each of the alkyl groups contains from 1 to 10 carbon atoms.
3. Bis(2,3-epoxypropyl) benzenephosphonate.
4. Bis(2,3-epoxypropyl) benzenephosphonite.
5. 2,3-epoxybutanediol bis(dimethanephosphinate).
6. A polymer of the ester defined in claim 1.
7. A polymer of the ester defined in claim 3.
8. A polymer of the ester defined in claim 4.
9. A polymer of the ester defined in claim 5.
10. A neutral ester of (*a*) benzenephosphonic acid and (*b*) a vic-epoxyalkanol of from 3 to 8 carbon atoms wherein the hydroxyl group is bonded to a terminal carbon atom and wherein the epoxy group is the only other substituent group and is not more than four carbon atoms removed from the carbon atom to which the hydroxyl group is bonded.
11. A neutral ester of (*a*) benzenephosphonous acid and (*b*) a vic-epoxyalkanol of from 3 to 8 carbon atoms wherein the hydroxyl group is bonded to a terminal carbon atom and wherein the epoxy group is the only other substituent group and is not more than four carbon atoms removed from the carbon atom to which the hydroxyl group is bonded.
12. A neutral ester of (*a*) a dialkanephosphinic acid wherein each alkyl group contains from 1 to 10 carbon atoms and (*b*) a vic-epoxyalkanol of from 3 to 8 carbon atoms wherein the hydroxyl group is bonded to a terminal carbon atom and wherein the epoxy group is the only other substituent group and is not more than four carbon atoms removed from the carbon atom to which the hydroxyl group is bonded.
13. A neutral ester of (*a*) a dibenzenephosphinous acid and (*b*) a vic-epoxyalkanol of from 3 to 8 carbon atoms wherein the hydroxyl group is bonded to a terminal carbon atom and wherein the epoxy group is the only other substituent group and is not more than four carbon atoms removed from the carbon atom to which the hydroxyl group is bonded.

14. An ester of (a) an alcohol selected from the group consisting of the vic-epoxy-substituted alkanols and vic-epoxy-substituted cycloalkanols, each containing from 3 to 15 carbon atoms, and vic-epoxy-substituted alkanediols containing from 4 to 15 carbon atoms, with (b) an acid of phosphorus of the group consisting of the hydrocarbonophosphonic acids, the hydrocarbonphosphonous acids, the dihydrocarbonphosphinic acids, the dihydrocarbonphosphinous acids and phosphorous acid, the hydrocarbon groups being selected from the group consisting of the monocyclic aromatic hydrocarbon groups of from 6 to 15 carbon atoms and the alkyl, cycloalkyl, alkenyl and cycloalkenyl groups of up to 12 carbon atoms, the analogs of these acids obtained by replacing at least one oxygen atom therof directly bonded to phosphorus with a dissimilar chalkogen atom, and the partial esters of all of these acids in which the esterifying groups are selected from the group consisting of the phenyl group and alkyl groups of from 1 to 10 carbon atoms.

15. A polymer of the ester defined in claim 14.

References Cited in the file of this patent

UNITED STATES PATENTS 2,627,521     Coover _____ Feb. 3, 1953

OTHER REFERENCES

Organophosphorous Compounds, Kosolapoff, 1955, pp. 126–127.